United States Patent
Torrico-Bascopé et al.

(10) Patent No.: US 10,193,459 B2
(45) Date of Patent: Jan. 29, 2019

(54) HIGH STATIC GAIN BI-DIRECTIONAL DC-DC RESONANT CONVERTER

(71) Applicant: Huawei Technologies Co., Ltd., Shenzhen (CN)

(72) Inventors: Grover Victor Torrico-Bascopé, Kista (SE); Fernando Ruiz Gomez, Kista (SE); Cicero Da Silveira Postiglione, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/828,736

(22) Filed: Dec. 1, 2017

(65) Prior Publication Data

US 2018/0102712 A1    Apr. 12, 2018

Related U.S. Application Data

(63) Continuation of application No. 15/205,477, filed on Aug. 29, 2016, now Pat. No. 9,876,434, which is a
(Continued)

(51) Int. Cl.
*H02M 3/335* (2006.01)
*H02M 1/15* (2006.01)
(Continued)

(52) U.S. Cl.
CPC ......... *H02M 3/33546* (2013.01); *H02M 1/15* (2013.01); *H02M 3/33584* (2013.01);
(Continued)

(58) Field of Classification Search
CPC ......... H02M 3/335; H02M 2001/0067; H02M 2001/007; H02M 7/4811; H02M 7/4807;
(Continued)

(56) References Cited

U.S. PATENT DOCUMENTS

| 7,742,318 B2 | 6/2010 | Fu et al. |
| 2002/0008981 A1 | 1/2002 | Jain et al. |

(Continued)

FOREIGN PATENT DOCUMENTS

| CN | 103187757 A | 7/2013 |
| EP | 2618449 A2 | 7/2013 |

(Continued)

OTHER PUBLICATIONS

Chen et al.,"Fully Soft-switched Bidirectional Resonant DC-DC Converter with a New CLLC Tank," 2010 Twenty-Fifth Annual IEEE Applied Power Electronics Conference and Exposition(APEC), XP031649545, pp. 1238-1242, Institute of Electrical and Electronics Engineers, New York, New York (Feb. 21-25, 2010).

(Continued)

*Primary Examiner* — Gustavo Rosario Benitez
(74) *Attorney, Agent, or Firm* — Leydig, Voit & Mayer, Ltd.

(57) ABSTRACT

The present invention relates to a bi-directional DC-DC converter comprising: a first terminal, a second terminal, a transformer circuit, a first high voltage side coupled to said first terminal, and a second low voltage side coupled to said second terminal; wherein said first high voltage side and said second low voltage side are coupled to each other by means of said transformer circuit, and said first high voltage side comprises a resonant tank circuit coupled between a first bridge circuit of said first high voltage side and a high voltage side of said transformer circuit. Furthermore, the invention also relates to a system comprising at least two such bi-directional DC-DC converters.

11 Claims, 10 Drawing Sheets

Related U.S. Application Data continuation of application No. PCT/EP2014/065643, filed on Jul. 21, 2014.

(51) Int. Cl.
  *H02M 7/48* (2007.01)
  *H02M 1/00* (2006.01)

(52) U.S. Cl.
  CPC ............ *H02M 2001/0058* (2013.01); *H02M 2007/4811* (2013.01); *H02M 2007/4815* (2013.01); *Y02B 70/1433* (2013.01); *Y02B 70/1491* (2013.01)

(58) Field of Classification Search
  CPC ....... H02M 7/4826; H02M 2001/0074; H02M 2001/0077; H02M 3/285; H02M 3/33523; H02M 3/33576; H02M 3/33584; H02M 1/4241; H02M 3/15; H02M 3/33546; H02M 2001/0058; Y02B 70/1491; Y02B 70/1433
  See application file for complete search history.

(56) References Cited

U.S. PATENT DOCUMENTS

| | | | |
|---|---|---|---|
| 2005/0275456 A1* | 12/2005 | Coleman | H01L 23/473 330/251 |
| 2007/0252664 A1* | 11/2007 | Saitoh | H04B 3/56 333/175 |
| 2009/0303753 A1 | 12/2009 | Fu et al. | |
| 2011/0007527 A1 | 1/2011 | Liu et al. | |
| 2011/0317452 A1 | 12/2011 | Anguelov et al. | |
| 2012/0243580 A1* | 9/2012 | Wright | H03F 1/565 375/219 |
| 2012/0287678 A1* | 11/2012 | Xu | H02M 3/158 363/17 |
| 2013/0169212 A1 | 7/2013 | Sun et al. | |
| 2013/0250623 A1 | 9/2013 | Xu et al. | |
| 2013/0301306 A1 | 11/2013 | Hosotani et al. | |
| 2014/0098573 A1 | 4/2014 | Pan et al. | |
| 2014/0112026 A1 | 4/2014 | Pan et al. | |
| 2015/0229225 A1* | 8/2015 | Jang | H02M 3/285 363/17 |
| 2016/0142031 A1* | 5/2016 | Ueki | H03H 7/09 361/56 |

FOREIGN PATENT DOCUMENTS

| | | |
|---|---|---|
| EP | 2863531 A1 | 4/2015 |
| WO | 2013186991 A1 | 12/2013 |

OTHER PUBLICATIONS

Krismer et al., "A Comparative Evaluation of Isolated Bi-directional DC/DC Converters with Wide Input and Output Voltage Range," IAS 2005, pp. 599-606, Institute of Electrical and Electronics Engineers, New York, New York, (2005).

Abe et al., "Consideration of Current Resonant Converter Topology for Bi-Directional Applications," 2013 IEEE 10th International Conference Power Electronics and Drive Systems (PEDS), pp. 153-158, Institute of Electrical and Electronics Engineers, New York, New York (Apr. 2013).

Kim et al., "Resonant DC-DC Converter for High Efficiency Bidirectional Power Conversion," 2013 Twenty-Eighth Annual IEEE Applied Power Electronics Conference and Exposition (APEC), pp. 2005-2011, Institute of Electrical and Electronics Engineers, New York, New York (Mar. 2013).

Klaassens et al., "Phase-Staggering Control of a Series-Resonant DC-DC Converter with Paralleled Power Modules," IEEE Transactions on Power Electronics, vol. 3, No. 2, pp. 164-173, Institute of Electrical and Electronics Engineers, New York, New York (Apr. 1988).

* cited by examiner

Fig. 1

Fig. 2 a) Forward Mode

Fig. 3a b) Reverse Mode

HIGH STATIC GAIN BI-DIRECTIONAL DC-DC RESONANT CONVERTER

CROSS-REFERENCE TO RELATED APPLICATIONS

This application is a continuation of U.S. patent application Ser. No. 15/250,477, filed on Aug. 29, 2016, which is a continuation of International Application No. PCT/EP2014/065643, filed on Jul. 21, 2014. All of the afore-mentioned patent applications are hereby incorporated by reference in their entireties.

TECHNICAL FIELD

The present invention relates to a bi-directional DC-DC converter. Furthermore, the invention also relates to a system comprising at least two such bi-directional DC-DC converters.

BACKGROUND

The developing trends of Isolated Bidirectional Direct Current-Direct Current (DC-DC) Converters (IBDC) are Wide Input-Wide Output (WIWO) voltage for very high efficiency, high power density and low cost. The resonant DC-DC converters are suitable technology to achieve high efficiency due to its intrinsic feature to achieve soft switching (Zero Voltage Switching, ZVS, and Zero Current Switching, ZCS). Furthermore, it is possible in these circuits to increase the switching frequency in order to reduce the size of the reactive components.

Common and widely used bidirectional DC-DC converters found in the industry today are the Dual Active Bridge (DAB) and resonant converters due to their availability to achieve high efficiency.

However, there are still remaining drawbacks regarding the conventional resonant converters at bidirectional operation (i.e. forward- and reverse-mode), e.g. mainly the voltage gain characteristic at reverse mode of operation. Furthermore, the high AC-current at the low voltage side of the output filter resulting in high power losses and large volume of the filter if the current technology is going to be used.

With the described bidirectional topological circuits according to conventional solutions the current stress on the resonant components on the low voltage side is high and compromises the efficiency of the converter.

Also, with the described bidirectional topological circuits according to conventional solutions it is not possible to achieve WIWO voltage and high efficiency. Moreover, it is very hard to get new topological circuits with reduced number of the active components (controlled semiconductors) where high reliability and performance in bidirectional energy conversion systems are required.

SUMMARY

An objective of the invention is to provide a concept which mitigates or solves the drawbacks and problems of conventional solutions.

Another objective of the present invention is to provide improved bi-directional converters for WIWO voltage applications in power systems.

According to a first aspect of the present invention, the above mentioned and other objective is achieved with a bi-directional DC-DC converter comprising:

a first terminal circuit, a second terminal circuit, a transformer circuit, a first high voltage side coupled to said first terminal circuit, and a second low voltage side coupled to said second terminal circuit; wherein said first high voltage side and said second low voltage side are coupled to each other by means of said transformer circuit, and said first high voltage side comprises a resonant tank circuit coupled between a first bridge circuit of said first high voltage side and a high voltage side of said transformer circuit.

The bridge circuits of the present converter may comprise active switches according to an implementation form of the first aspect.

With converters according to embodiments of the present invention very high variation of the input and output voltage, narrow frequency variation for voltage regulation, high efficiency, high power density and low cost can be achieved due the at least the following points. The present converter has simplified and more efficient layout due to the placement of the resonant tank on the high voltage side. This will also reduce the current stress and consequently the losses of the converter.

Furthermore, no energy storage elements in the low voltage side of the converter are needed in order to get ZVS. Embodiments of the present invention can provide ZVS and ZCS in both directions of the converter.

Also, increased reliability is provided due to reduced number of the synchronous drivers for the low voltage side semiconductors but also due to the common reference that can be used.

The internal energy consumption needed is also reduced with the present circuit layout, which will increase the efficiency of the converters according to the present invention compared to conventional converters.

According to a first implementation form of the first aspect as such, said resonant tank circuit comprises: a first branch comprising a first capacitor $C_{r1}$ and a first inductor $L_{r1}$ coupled in series with each other, a second capacitor $C_{r2}$ and a second inductor $L_{r2}$; wherein said first branch, said second inductor $L_{r2}$ and said second capacitor are coupled to a common node; wherein said second capacitor $C_{r2}$ is coupled between said common node and a first terminal of said high voltage side of said transformer circuit; wherein said second inductor $L_{r2}$ is coupled between said common node (C) and a second terminal of said high voltage side of said transformer circuit.

This can be denoted as a Capacitor-Inductor-Inductor-Capacitor (CLLC) type resonant tank. Therefore, reduced number of the active semiconductors at high voltage side and low voltage side are needed.

According to a second implementation form of the first implementation form of the first aspect, a first terminal of the first capacitor $C_{r1}$ forms a first (connection) terminal of said resonant tank circuit, a second terminal of the first capacitor $C_{r1}$ is connected to a first terminal of the first inductor $L_{r1}$;

a second terminal of the first inductor $L_{r1}$ is connected to a first terminal of the second capacitor $C_{r2}$ and to a first terminal of the second inductor $L_{r2}$;

a second terminal of the second inductor $L_{r2}$ forms a third (connection) terminal of said resonant tank circuit;

a second terminal of the second capacitor $C_{r2}$ forms a second (connection) terminal of said resonant tank circuit.

According to a third implementation form of the second implementation form of the first aspect, said first terminal of said resonant tank circuit and said third terminal of said resonant tank circuit are connected to said first bridge circuit; and said second terminal of said resonant tank circuit and said third terminal of said resonant tank circuit are connected to said high voltage side of said transformer circuit.

According to a fourth implementation form of the first or second implementation forms of the first aspect, said first bridge circuit is a full bridge and said second low voltage side comprises a further full bridge coupled to a low voltage side of said transformer circuit, or said first bridge circuit is a half bridge, said second low voltage side comprises a push-pull circuit connected to the low voltage side of the transformer circuit and said transformer circuit comprises on its low voltage side a second winding comprising a center tap, or said first bridge circuit is a half bridge and said second low voltage side comprises a push-pull circuit with an autotransformer connected to the low voltage side of the transformer circuit. Hence, the present resonant tank can be added to any converter topology for different applications.

According to a fifth implementation form of the fourth implementation of the first aspect, said resonant tank circuit comprises: a first branch comprising a first capacitor $C_{r1}$ and a first inductor $L_{r1}$ coupled in series with each other, a second branch comprising a second inductor $L_{r2}$, a second capacitor $C_{r2}$ coupled in series with each other, a third branch comprising a third capacitor $C_{r3}$ and a third inductor $L_{r3}$ coupled in series with each other; wherein said first branch, second branch and third branch are coupled to a common node (C); wherein said second branch is coupled between said common node and a first terminal of said high voltage side of said transformer circuit; and wherein said third branch is coupled between said common node and a second terminal of said high voltage side of said transformer circuit. This can be denoted as an Inductor-Capacitor-Inductor-Capacitor-Inductor-Capacitor or 3LC type resonant tank. Therefore, reduced number of the active semiconductors at high voltage side and low voltage side are needed. Further, the voltage gain characteristic is greater than 1, only with passive components and boost and buck mode of operation is possible.

According to a sixth implementation form of the fifth implementation form of the first aspect, a first terminal of the first capacitor $C_{r1}$ forms a first (connection) terminal of said resonant tank circuit;

a second terminal of the first capacitor $C_{r1}$ is connected to a first terminal of the first inductor $L_{r1}$;

a second terminal of the first inductor $L_{r1}$ is connected to a first terminal of the second inductor $L_{r2}$ and to a first terminal of the third inductor $L_{r3}$; a second terminal of the second inductor $L_{r2}$ is connected to a first terminal of the second capacitor $C_{r2}$;

a second terminal of the second capacitor $C_{r2}$ forms a second (connection) terminal of said resonant tank circuit;

a second terminal of the third inductor $L_{r3}$ is connected to a first terminal of the third capacitor $C_{r3}$;

a second terminal of the third capacitor $C_{r3}$ forms a third (connection) terminal of said resonant tank circuit.

According to a seventh implementation form of the sixth implementation form of the first aspect, said first (connection) terminal of said resonant tank circuit and said third (connection) terminal of said resonant tank circuit are connected to said first bridge circuit; and said second (connection) terminal of said resonant tank circuit and said third (connection) terminal of said resonant tank circuit are connected to the high voltage side of said transformer.

According to an eighth implementation form of any of the fifth to seventh implementation forms of the first aspect, said first bridge circuit is a full bridge and said second low voltage side comprises a further full bridge coupled to a low voltage side of said transformer circuit, or said first bridge circuit is a half bridge and said second low voltage side comprises a full bridge coupled to a low voltage side of said transformer circuit, or said first bridge circuit is a half bridge, said second low voltage side comprises a push-pull circuit connected to the low voltage side of the transformer circuit and said transformer circuit comprises on its low voltage side a second winding comprising a center tap, or said first bridge circuit is a half bridge and said second low voltage side comprises a push-pull circuit with an autotransformer connected to the low voltage side of the transformer circuit. Hence, the present resonant tank circuit can be added to any converter topology for different applications.

According to a ninth implementation form of any of the fifth to eight implementation forms of the first aspect, at least two of said first inductor $L_{r1}$, said second inductor $L_{r2}$ and said third inductor $L_{r3}$ are magnetically coupled to each other in one common magnetic core. Thereby, the number of components in the resonant tank circuit can be reduced.

According to a tenth implementation form of any of the implementation forms of the first aspect or the first aspect as such, a second filter is coupled between a positive and a negative terminal of the second terminal circuit. Thereby noise can be removed in the low voltage side of the converter.

According to an eleventh implementation form of any of the implementation forms of the first aspect or the first aspect as such, a first filter is coupled in parallel with said first terminal and said first bridge circuit. Thereby noise can be removed in the high voltage side of the converter.

According to a second aspect of the invention, the above mentioned and other objective is achieved with a bi-directional DC-DC converter system comprising two or more bi-directional DC-DC converters according to the first aspect or any implementation form of the first aspect, wherein said two or more bi-directional DC-DC converters are interleaved with each other, i.e. the bi-directional DC-DC converters are coupled with each other in different configurations.

Interleaving is to operate two or more DC-DC converters in parallel and to operate the switches of the bridge circuits of each respective DC-DC converter with phase difference with respect to each other. Thereby, the resultant ripple current in the input and the output of the interleaved system can be minimized.

Interleaving two or more of the present converters is preferred for high power applications. Further, interleaving two or more converters reduces the number of capacitors needed for the output filter when phase-shifting control is used. It is also realized that the present converters can be interleaved in a variety of different serial and parallel configurations well known in the art.

According to a first implementation form of the second aspect as such, said first high voltage sides of said two or more bi-directional DC-DC converters are coupled in series with each other.

According to a second implementation form of the first implementation form of the second aspect or the second aspect as such, said first high voltage sides of said two or more bi-directional DC-DC converters are coupled in parallel with each other.

According to a third implementation form of the first or second implementation forms of the second aspect or the second aspect as such, said second low voltage sides of said two or more bi-directional DC-DC converters are coupled in series with each other.

According to a fourth implementation form of any of the first to third implementation forms of the second aspect or the second aspect as such, said second low voltage sides of said two or more bi-directional DC-DC converters are coupled in parallel with each other.

A further aspect of the present invention relates to an electrical circuit comprising two or more coupling nodes (or terminals) for coupling to other electrical circuits and two or more inductors, wherein said two or more inductors are magnetically coupled to each other in one common magnetic core. Thereby, the number of inductive components in the electrical circuit and also the manufacturing costs are reduced.

It should be noted that further applications and advantages of the present converter and system will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
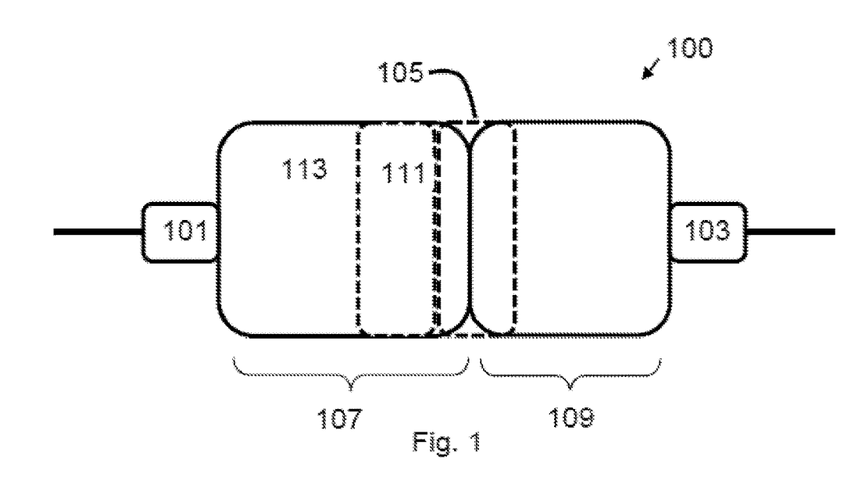
FIG. 1 shows a bi-directional DC-DC converter according to an embodiment of the present invention.

FIG. 1 shows a simplified block diagram of a bi-directional DC-DC converter 100 according to an embodiment of the present invention. With reference to FIG. 1 the bi-directional DC-DC converter 100 comprises a (first) High Voltage (HV) (e.g. connection) terminal circuit 101 of an HV side 107, a (second) Low Voltage (LV) (e.g. connection) terminal circuit 103 of an LV side 109 and a transformer circuit 105. The HV side 107 is coupled to the first terminal circuit 101 of the DC-DC converter 100, and the LV side 109 is coupled to the second terminal circuit 103 of the DC-DC converter 100.

Further, the HV side 107 and the LV side 109 are coupled to each other by means of the mentioned transformer circuit 105. Moreover, the HV side 107 comprises a resonant tank circuit 111 coupled between a first bridge circuit 113 of the HV side 107 and a HV side of the transformer (circuit) 105. The terminal circuits 101 and 103 of the converter 100 and the different implementation form of this converter 100 described in the following typically comprise a positive terminal (for applying or providing a positive potential) and a negative terminal (e.g. for applying or providing a negative or GND potential). These positive and negative terminals are typically connection terminals adapted for connecting to one or more other devices. In the forward direction (High voltage in-Low voltage out) of the converter 100, the first terminal circuit 101 forms in input of the converter 100 and the second terminal circuit 103 forms an output of the converter 100. In the reverse direction (Low voltage in-High voltage out) of the converter 100, the second terminal circuit 103 forms in input of the converter 100 and the first terminal circuit 101 forms an output of the converter 100.

HV side and LV side mean that at the HV side typically the comparatively higher voltages are applied/are provided when compared to the LV side.

Figure 2:
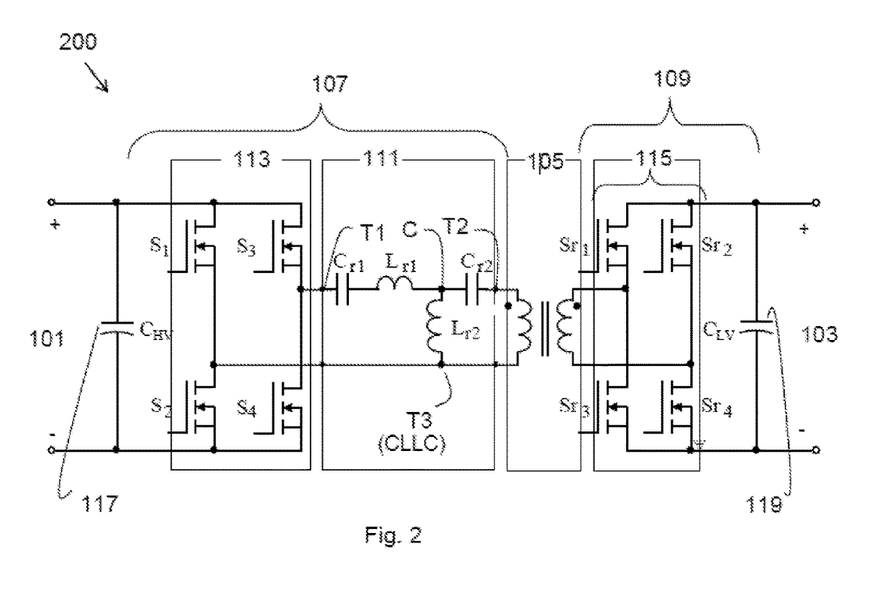
FIG. 2 shows a CLLC bi-directional DC-DC converter according to an embodiment of the present invention.

According to an embodiment of the present invention, the resonant tank circuit 111 is of Capacitor-Inductor-Inductor-Capacitor (CLLC) type. FIG. 2 shows a bi-directional DC-DC converter 200 according to an embodiment of the present invention with a CLLC resonant tank 111. The bi-directional DC-DC converter 200 forms a possible implementation form of the bi-directional DC-DC converter 100 as shown in FIG. 1.

In the CLLC bi-directional DC-DC converter 200 an example of a CLLC resonant tank 111 implemented in the HV side 107 of the bi-directional DC-DC converter is shown in FIG. 2. Among the characteristics of this resonant tank circuit are the possibility to achieve WIWO voltage range in forward mode and acceptable voltage gain in reverse mode, but also high efficiency and high power density.

With reference to FIG. 2, the resonant tank circuit 111 according to the CLLC embodiment comprises a first capacitor $C_{r1}$, a first inductor $L_{r1}$, a second capacitor $C_{r2}$, and a second inductor $L_{r2}$.

A first terminal of the first capacitor $C_{r1}$ forms a first (connection) terminal T1 of the CLLC resonant tank circuit 111. A second terminal of the first capacitor $C_{r1}$ is connected to a first terminal of the first inductor $L_{r1}$. A second terminal of the first inductor $L_{r1}$ is connected to a first terminal of the second capacitor $C_{r2}$ and to a first terminal of the second inductor $L_{r2}$. Further, a second terminal of the second inductor $L_{r2}$ forms a third (connection) terminal T3 of the resonant tank circuit 111. A second terminal of the second capacitor $C_{r2}$ forms a (second) connection terminal T2 of the CLLC resonant tank circuit 111.

Furthermore, the HV side 107 comprises a first full bridge circuit 113 coupled between the first HV terminal circuit 101 and the resonant tank circuit 111.

The first connection terminal T1 of the resonant tank circuit 111 is connected between third S3 and fourth S4 switches of the first bridge circuit 113. The third connection terminal T3 of the resonant tank circuit 111 is connected between first S1 and second S2 switches of the first bridge circuit 113. The second connection terminal T2 of the resonant tank circuit 111 is connected to a first terminal of the HV side (e.g. a first ending of a first winding) of the transformer circuit 105, and the third connection terminal T3 of the resonant tank circuit 111 is connected to a second terminal of the HV side (of a second ending of the first winding) of the transformer circuit 105.

In other words the CLLC resonant circuit 111 according to this embodiment comprises a first branch comprising a first capacitor $C_{r1}$ and a first inductor $L_{r1}$ coupled in series with each other, a second capacitor $C_{r2}$ and a second inductor $L_{r2}$. The first branch, said second inductor $L_{r2}$ and said second capacitor are coupled to a common node C. Said second capacitor $C_{r2}$ is coupled between said common node C and the first terminal of said high voltage side of said transformer circuit 105. Said second inductor $L_{r2}$ is coupled between said common node C and the second terminal of said high voltage side of said transformer circuit 105.

The values for the different capacitors and inductors of the present resonant tank 111 are dependent on the particular application.

The HV side 107 includes the first terminal circuit 101 which is connected to first and second terminals of a first filter 117 implemented as a capacitor $C_{HV}$ in this particular example. In detail, the first filter 117 is connected between the positive terminal and the negative terminal of the first terminal circuit 101.

The first and second terminals of the first filter 117 are in turn connected to a positive terminal and a negative terminal of the full bridge circuit 113, respectively. The full bridge circuit 113 comprises switches S1, S2, S3 and S4 implemented as N-Channel Mosfet transistors in this example. However, other implementations for the switches are possible too (such as Insulated Gate Bipolar Transistor, IGBT; Metal Oxide Silicon Field Effect Transistor, MOSFET; Junction Gate Field-Effect Transistor, JFET; Gate Turn-off Thyristor, GTO).

Mentioned switches S1, S2, S3 and S4 of the full bridge circuit 113 of the HV side are followed by the above described CLLC resonant tank circuit 111, which in turn is connected to the HV side of the transformer circuit 105. The transformer circuit 105 magnetically couples the HV side 107 and the LV side 109 of the converter device 200.

Further, first and second terminals of the LV side (e.g. endings of a second winding) of the transformer (circuit) 105 are connected to a second full bridge circuit 115 of the LV side 109. The second full bridge circuit 115 includes first $Sr_1$, second $Sr_2$, third $Sr_3$ and fourth $Sr_4$ switches. A positive and a negative connection terminals of the second full bridge circuit 115 are connected to first and second terminals of a second filter 119 of the LV side 109 which in this example is implemented as a capacitor $C_{LV}$. Finally, the first and second terminals of the second filter 119 are connected to the second terminal circuit 103 of the present DC-DC converter 200. In detail, the first filter 117 is connected between the positive terminal and the negative terminal of the second terminal circuit 103.

Figure 3A:
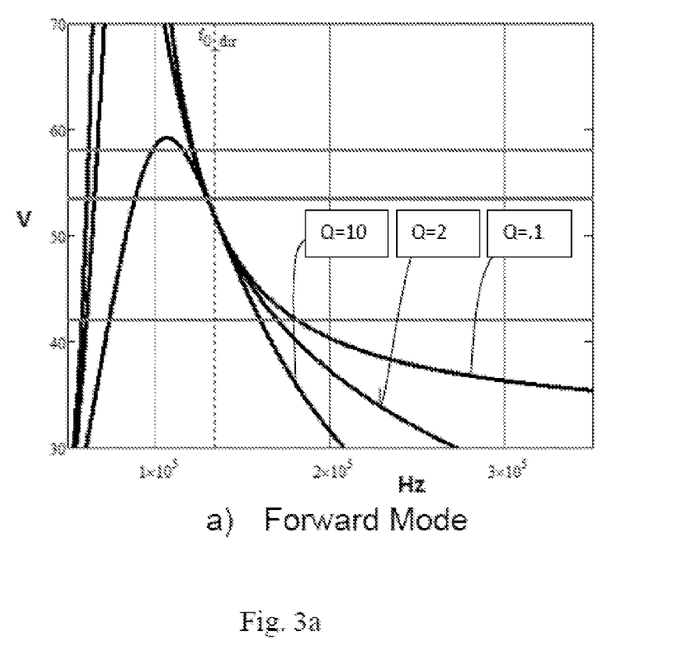
FIGS. 3a and 3b show voltage gain characteristics for forward and reverse mode for the CLLC bi-directional DC-DC converter as shown in FIG. 2.
Figure 3B:
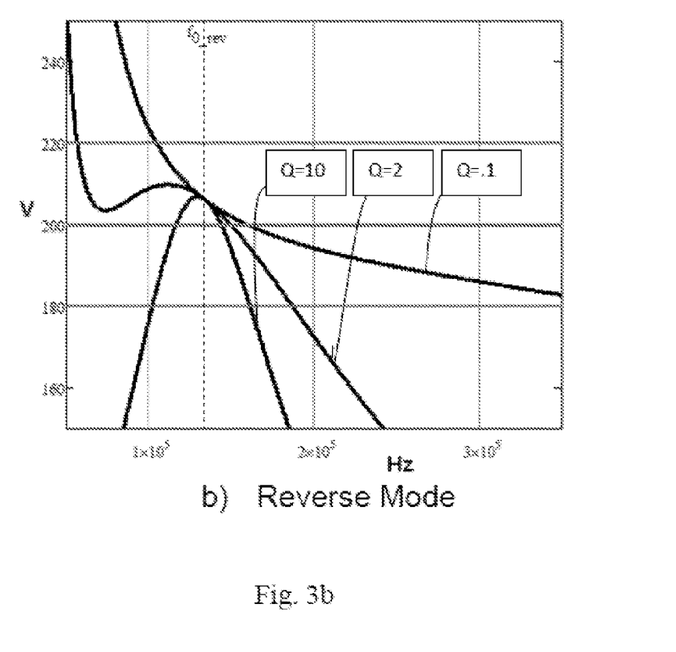

The voltage gain characteristics for both forward (shown in FIG. 3a) and reverse mode (shown in FIG. 3b) of this particular embodiment in FIG. 2 are shown in FIGS. 3a and 3b.

The y-axis represents the voltage and the x-axis represents the frequency. As it can be seen in the graphs of FIGS. 3a and 3b, the natural resonance frequency of the resonant tank is equal in both directions. In the reverse mode, the voltage gain characteristic is limited and highly dependent of the quality factor Q which is dependent on the values of the components in the resonant tank circuit 111 (in the FIGS. 3a and 3b Q=10, 2 and 0.1 are shown). However, this is a design related issue and will depend of the choice of the values for the components (parameters) of the resonant tank and the application.

Figure 4A:
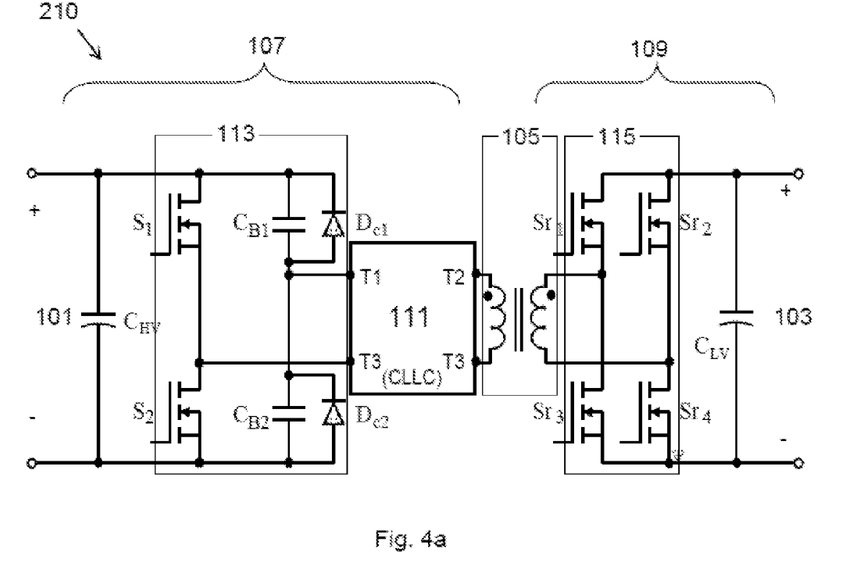
FIGS. 4a-4c show other further CLLC bi-directional DC-DC converters according to embodiments of the present invention.
Figure 4B:
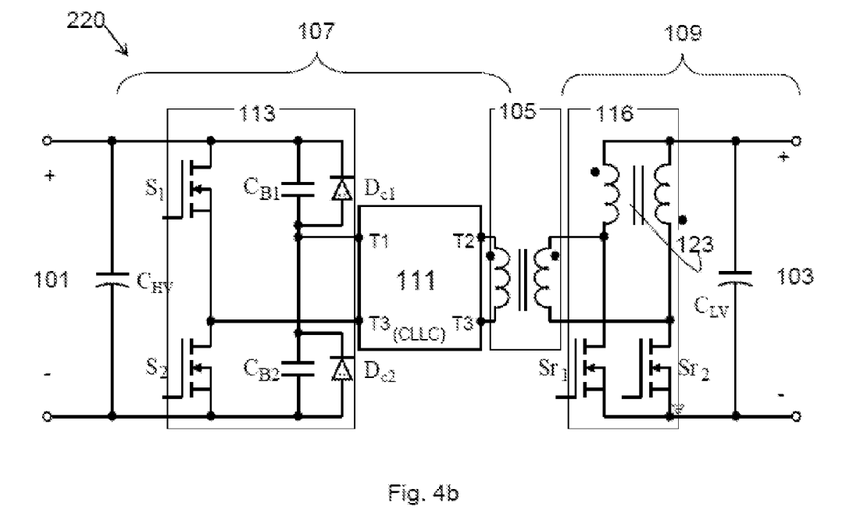
Figure 4C:
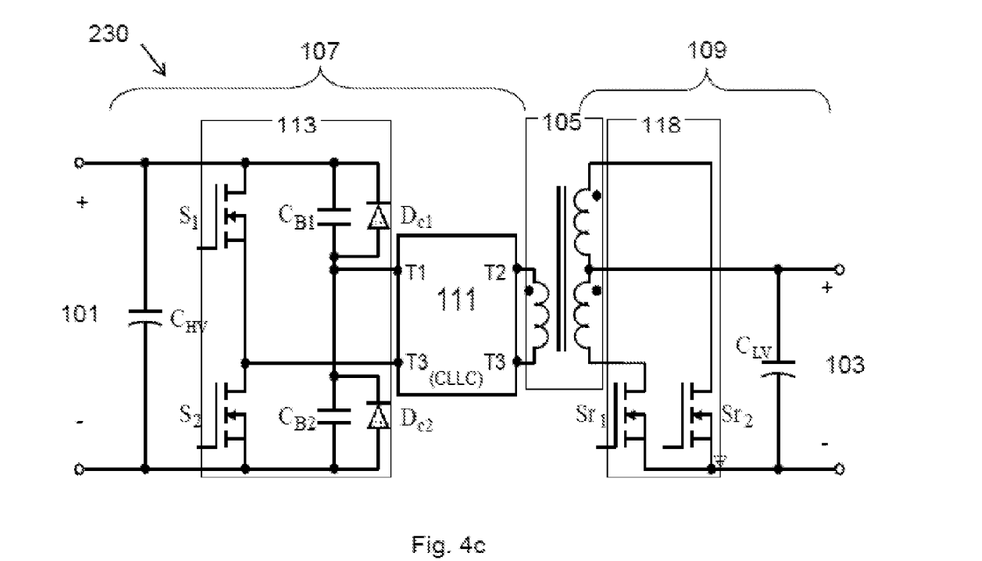

Based on the configuration of the LV side 107 of the above described converter, different topological implementation forms of the bi-directional DC-DC converter are possible which are illustrated in FIG. 4a-4c. These implementation forms relate to the configurations of the first bridge circuit 113 and the second bridge circuit 105, respectively.

In the converter 210 shown in FIG. 4a, the first bridge circuit 113 in the HV-side 107 is implemented as a Half Bridge (HB) circuit and the second bridge circuit 115 in the LV side 109 is implemented as a Full Bridge (FB) circuit.

The HB circuit 113 in the HV side 107 in FIG. 4a comprises first S1 and second S2 switches; first CB1 and second CB2 capacitors (CB1 and CB2 may be part of the resonant tank circuit in certain applications when the first bridge circuit has this HB configuration); and first Dc1 and second Dc2 clamping diodes. The first connection terminal T1 of the resonant tank circuit 111 is connected between a series connection of the first capacitor CB1 in parallel with the first clamping diode Dc1 and the second capacitor CB2 in parallel with the second clamping diode Dc2. The third connection terminal T3 of the resonant tank circuit 111 is connected between the series connection of the first switch S1 and the second switch S2.

The FB circuit in the LV side 109 in FIG. 4a is configured in the same way as the FB circuit in FIG. 2 as described above.

In the converter 220 as shown in FIG. 4b, the first bridge circuit 113 in the HV-side 107 is implemented as a Half Bridge circuit (as the one in FIG. 4a). Furthermore, the LV side 107 of the convert 220 comprises instead of a bridge circuit a push pull-autotransformer circuit 116.

The PP-autotransformer circuit 116 in the LV side in FIG. 4b comprises switches Sr1, Sr2 and an autotransformer 123. The autotransformer 123 has two windings (first and second windings) in one common core. The first winding is connected the first switch Sr1, and the second winding is connected to the second switch Sr2. The midpoint of the autotransformer 123 is connected to a positive terminal of the LV side. The common point of Sr1 and Sr2 are connected to a negative terminal of the LV side. Further, the first terminal of the LV side (e.g. a first ending of a second winding) of the transformer 105 is connected between the first winding of the autotransformer 123 and the first switch Sr1. The second terminal of the LV side (e.g. a second ending of the second winding) of the transformer 105 is connected between the second winding of the autotransformer 123 and the second switch Sr2.

In the converter 230 shown in FIG. 4c, the first bridge circuit 113 is implemented as HB circuit. Furthermore, the converter 230 comprises in its LV side instead of a bridge circuit a Push Pull (PP) Circuit 118. The PP circuit 118 comprises a first switch Sr1 and a second switch Sr2. In the embodiment shown in FIG. 4c, the first switch Sr1 and the second switch Sr2 are implemented exemplarily as N-channel Mosfets. The transformer circuit 105 is implemented as a transformer comprising on its HV side a first winding connected with its first end to the second terminal T2 and its second end to the third terminal T3 of the resonant tank circuit 111. Furthermore, on LV side the transformer comprises a second winding having a first end, a center tap and a second end. A first terminal of the first switch Sr1 (e.g. a drain terminal) is connected to the second end of the second winding. A first terminal of the second switch Sr2 (e.g. a drain terminal) is connected to the first end of the second winding. Second terminals (e.g. source terminals) of the first switch Sr1 and second switch Sr2 are connected together to a negative terminal of the second terminal circuit 103. Furthermore, the center tap of the transformer is connected to the positive terminal of the second terminal circuit 103. A second filter $C_{LV}$ is connected between the negative and positive terminal of the second terminal circuit 103.

Figure 5:
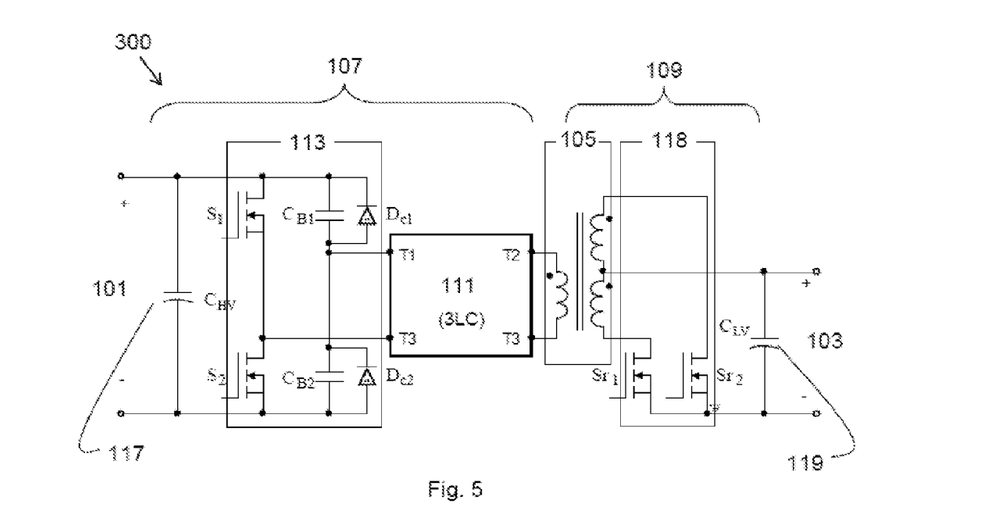
FIG. 5 shows a 3LC bi-directional DC-DC converter according to an embodiment of the present invention.

According to an embodiment of the present invention, the tank circuit 111 is of three Inductor-Capacitor type, i.e. Inductor-Capacitor-Inductor-Capacitor-Inductor-Capacitor, denoted 3LC in this disclosure. FIG. 5 shows such a 3LC resonant tank 111 implemented in the HV side 107 of a bi-directional DC-DC converter 300 according to an embodiment of the to the present invention, which forms a possible implementation form of the converter 100. Among the characteristics of this resonant tank circuit 111 are the possibility to achieve suitable voltage gain in reverse mode, but also high efficiency and high power density. Another important effect is that the WIWO voltage range can be achieved with a very narrow frequency variation.

From left in FIG. 5 the HV side 107 includes a first terminal circuit 101 of the HV side which is connected to first and second terminals of a first filter 117 implemented as a capacitor in this example, $C_{HV}$. The first and second terminals of first filter 117 are in turn connected to a positive terminal and a negative terminal of the FB circuit 113 as described above. Mentioned switches S1, S2, S3 and S4 of the FB circuit 113 of the HV side are followed by the 3LC resonant tank circuit 111. The FB circuit is coupled to connection terminals T1 and T3 of the resonant tank circuit 111. Further, the resonant tank circuit 111 is connected to the LV side of the transformer circuit 105 via connection terminals T2 and T3. The transformer circuit 105 magnetically couples the HV side 107 and the LV side 109 of the present converter 300.

In the example shown in FIG. 5, the LV side 109 of the converter 300 is implemented as a push pull circuit 118 (comprising switches $Sr_1$, $Sr_2$ in combination with the transformer circuit 105 having the second winding with center tap (as shown in FIG. 4c). Hence, the converter 300 differs from the converter 230 in that the resonant tank circuit 111 in the converter 300 is implemented as 3LC resonant tank.

Alternatively, also an implementation with a push pull-autotransformer circuit 116 on the LV side 109 would be possible (as shown in FIG. 4b).

Figure 8A:
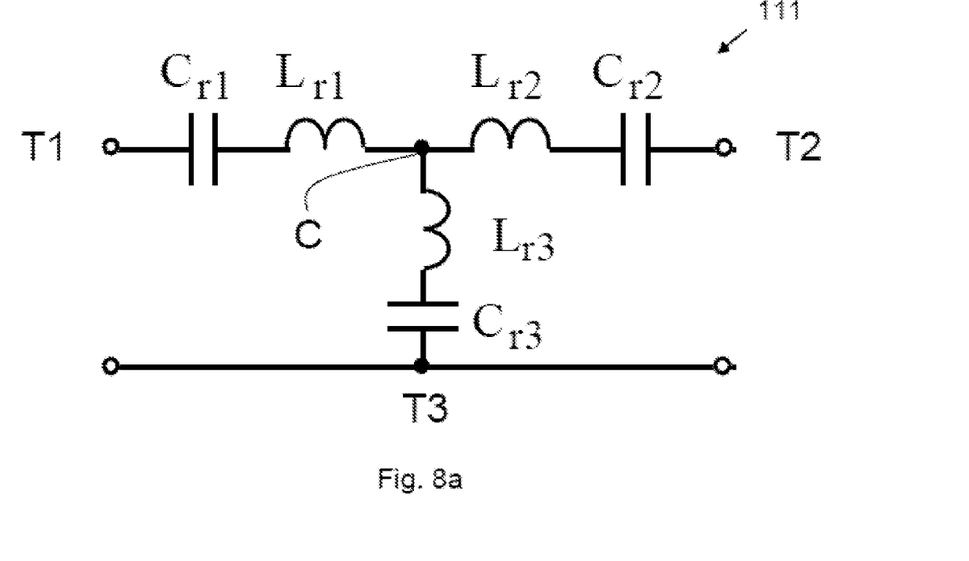
FIGS. 8a and 8b show two different 3LC resonant tanks as they can be used with the embodiments shown in FIGS. 5 and 7a-7c.

FIG. 8a shows one proposed 3LC resonant tank 111 configuration for use in embodiments of the present invention which comprises a first capacitor $C_{r1}$, a first inductor $L_{r1}$, a second inductor $L_{r2}$, a second capacitor $C_{r2}$, a third inductor $L_{r3}$ and a third capacitor $C_{r3}$. A first terminal of the first capacitor $C_{r1}$ forms a first connection terminal T1 of the 3LC resonant tank circuit 111. A second terminal of the first capacitor $C_{r1}$ is connected to a first terminal of the first inductor $L_{r1}$. A second terminal of the first inductor $L_{r1}$ is connected to a first terminal of the second inductor $L_{r2}$ and to a first terminal of the third inductor $L_{r3}$. A second terminal of the second inductor $L_{r2}$ is connected to a first terminal of the second capacitor $C_{r2}$. A second terminal of the second capacitor $C_{r2}$ forms a second connection terminal T2 of the resonant tank circuit 111. A second terminal of the third inductor $L_{r3}$ is connected to a first terminal of the third capacitor $C_{r3}$. A second terminal of the third capacitor $C_{r3}$ forms a third connection terminal T3 of the resonant tank circuit 111. As can be seen from FIG. 8a, the three inductors $L_{r1}$, $L_{r2}$, $L_{r3}$ are all connected to a common node C.

In other words the proposed 3LC resonant tank configuration shown in FIG. 8a comprises a first branch comprising a first capacitor $C_{r1}$ and a first inductor $L_{r1}$ coupled in series with each other, a second branch comprising a second inductor $L_{r2}$, a second capacitor $C_{r2}$, a third branch comprising a third capacitor $C_{r3}$ and a third inductor $L_{r3}$ coupled in series with each other. The first branch is coupled in series with the second branch, and the third branch is coupled between a common node C of the first branch and the second branch and the third terminal T3 of the resonant tank circuit 111. The second T2 and the third terminals T3 of the resonant tank circuit 111 are to be coupled to the high voltage side of the transformer circuit 105. The values for the different capacitors and inductors of the present resonant tank 111 are dependent on the particular application.

The features of this resonant tank 111 are unique as it increases the voltage gain for both directions to be greater than 1, which is the gain obtained at the resonant frequency. This feature makes it possible to achieve WIWO voltage variation.

Figure 6A:
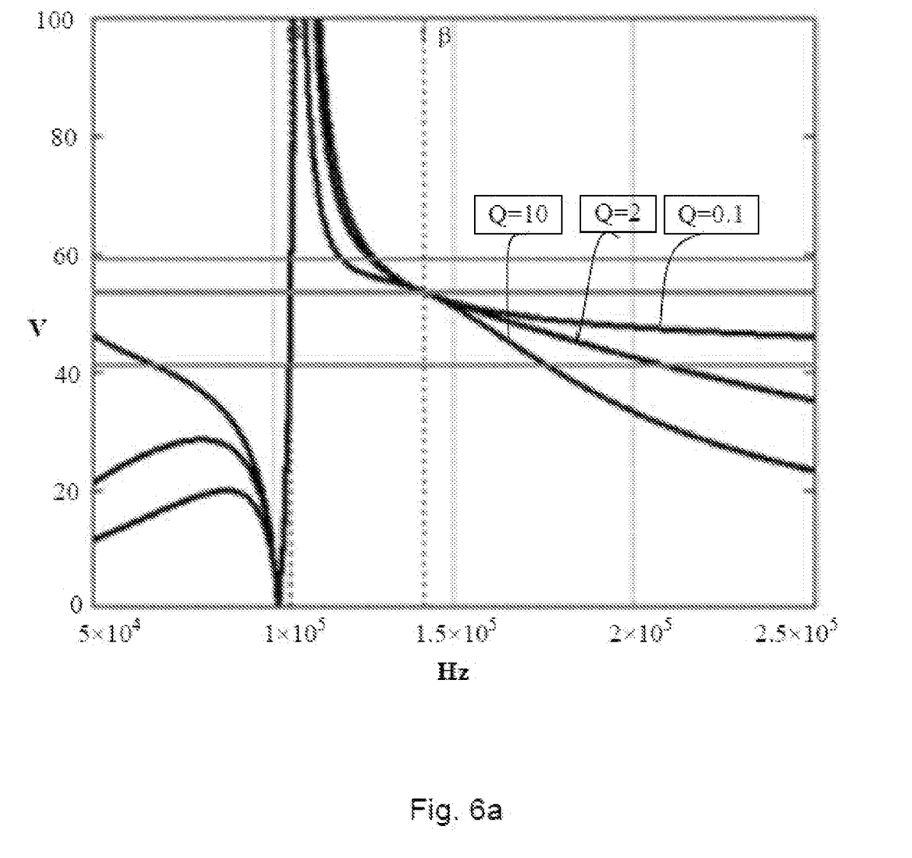
FIGS. 6a and 6b show voltage gain characteristics for forward and reverse mode for the 3LC bi-directional DC-DC converter as shown in FIG. 5.
Figure 6B:
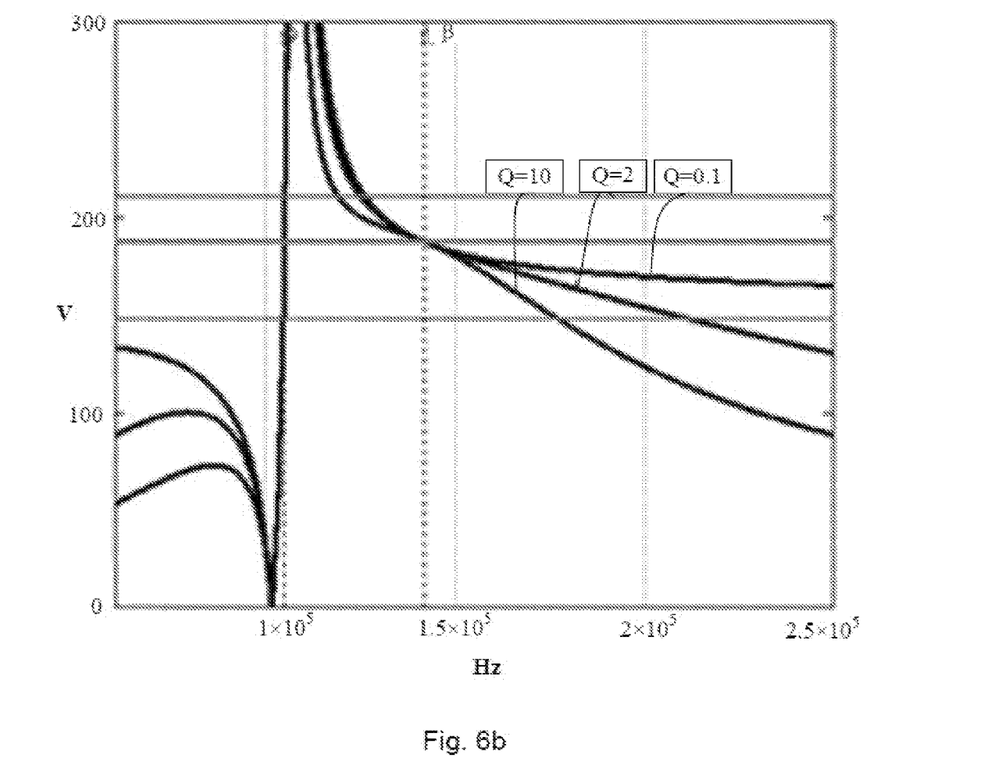

The voltage gain characteristics for both forward and reverse mode are shown in FIG. 6a (forward mode) and 6b (reverse mode) for the 3LC bi-directional DC-DC converter 300 as shown in FIG. 5. The y-axis represents the voltage and the x-axis represents the frequency. As it can be seen in the graphs in FIGS. 6a and 6b, the natural resonance frequency of the tank is equal in both directions. The effect introduced by the parallel LC-network ($L_{r3}$ and $C_{r3}$) makes the gain to change from 0 to infinity in a very sharp way. The final value is depending of the quality factor Q (Q=10, 2, 0.1 are shown in FIGS. 6a and 6b). This result in high gain, but it is also important to mention that the characteristics of this converter are the same as the standard LLC resonant tank for both directions. This guarantees that the converter will always work in the most optimum power transferring point in both forward and reverse modes.

Figure 8B:
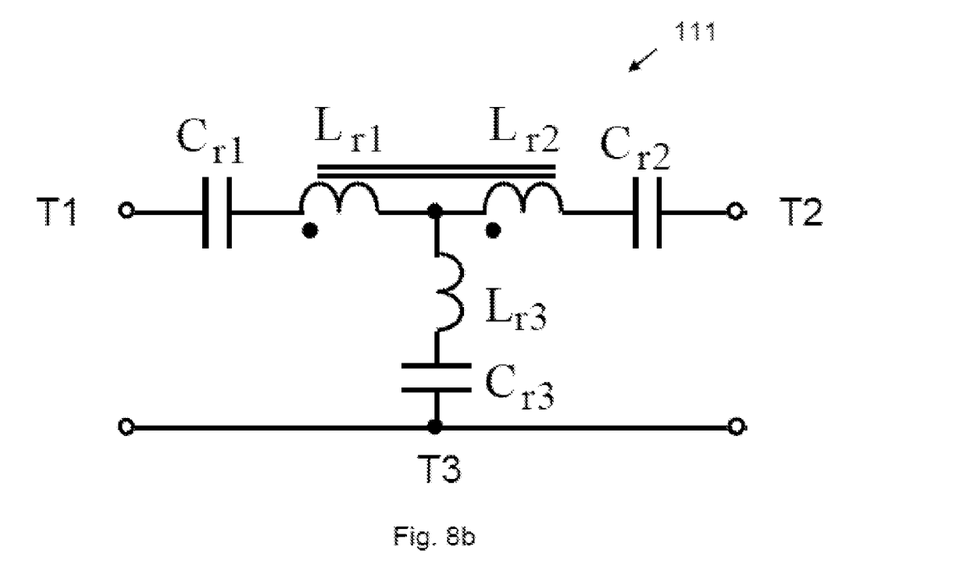

In FIG. 8b a magnetic integration of the first $L_{r1}$ and the second $L_{r2}$ inductors of the resonant tank circuit 111 using the same magnet core is illustrated. This simplifies the building of the 3LC resonant tank circuit 111 of the present converter and also reduces the number of components. However, all the inductors of the resonant tank circuit 111 could be integrated in a single magnetic component. Therefore, embodiments of the present invention also relate to an electrical circuit 111 comprising two or more coupling nodes for coupling to other electrical circuits and two or more inductors, wherein the two or more inductors are magnetically coupled to each other in one common magnetic core. The present electrical circuit 111 can also be used in other applications in which two or more inductors are used.

Figure 7A:
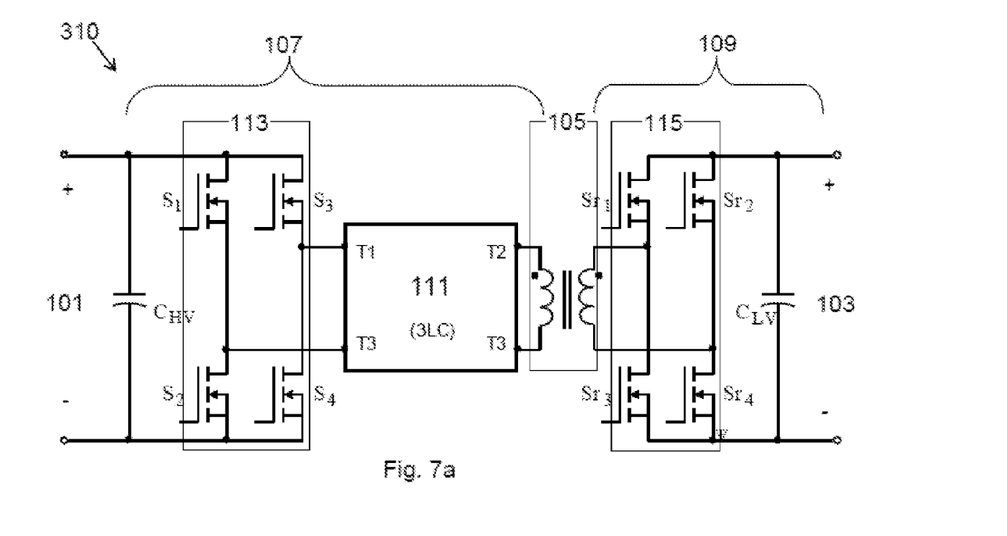
FIGS. 7a-7c show other further 3LC bi-directional DC-DC converter according to embodiments of the present invention.
Figure 7B:
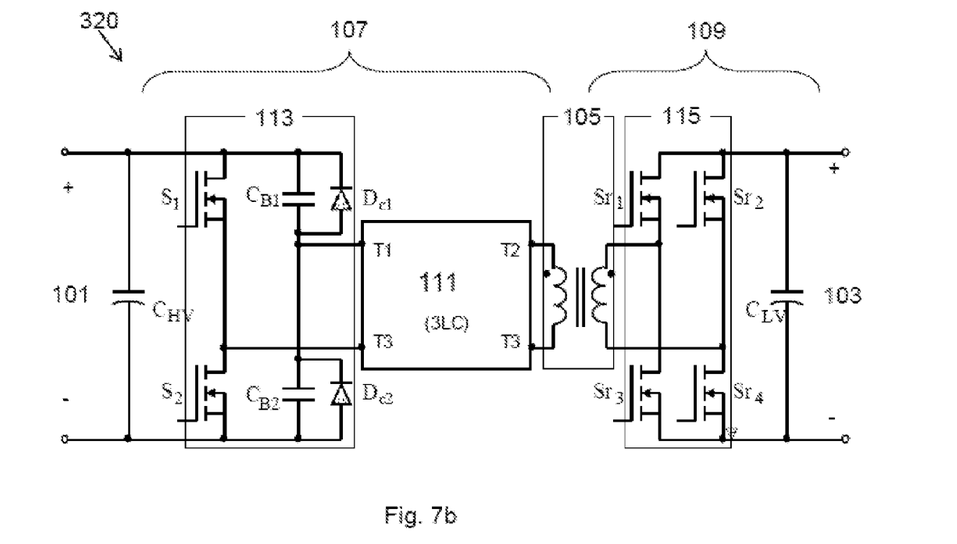
Figure 7C:
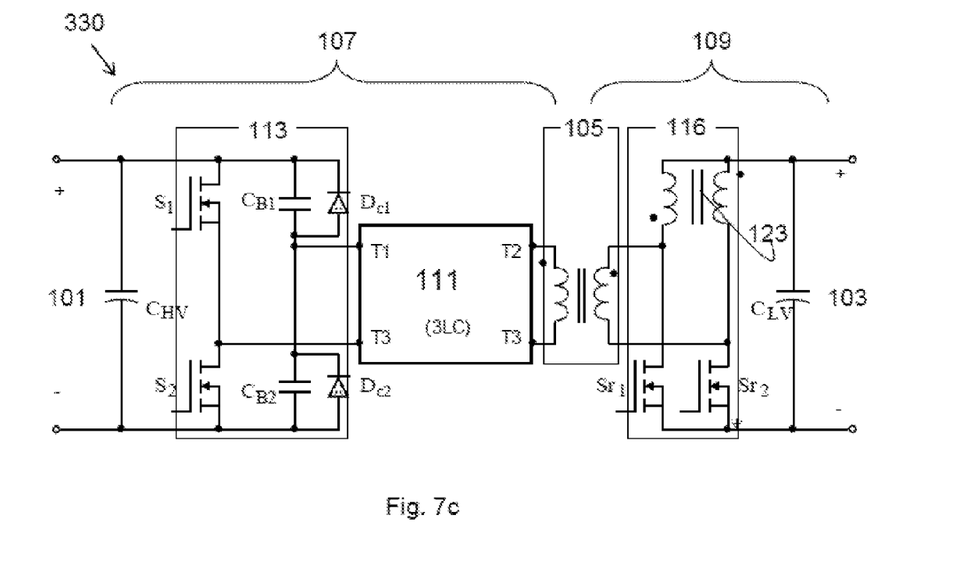

Based on the 3LC resonant tank 111, we have different converter topological circuits that are illustrated (additionally to the one shown in FIG. 5) in FIG. 7a-7c according to further embodiments of the present invention.

The FB, HB and PP circuits in FIG. 7a-7c are configured in the same way as the FB, HB and PP circuits in the embodiments shown in FIG. 2, 4a, 4b. FIG. 7a shows a Full Bridge-Full Bridge implementation for the bridge circuits 113, 115 as the one in FIG. 2. FIG. 7b shows a Half Bridge-Full Bridge implementation for the bridge circuits 113, 115 as the one shown in FIG. 4a. FIG. 7c shows a Half Bridge-Push Pull circuit with Autotransformer implementation for the bridge circuit 113 and LV side 109 as the one shown in FIG. 4b.

For high power applications, interleaving two or more DC-DC converters of embodiments of the present invention is preferred so as to obtain a bi-directional DC-DC converter system.

For instance, one possible configuration is to have series connection of the HV sides 107a, 107b, . . . , 107n of the DC-DC converters and parallel connection of the LV sides 109a, 109b, 109n of the DC-DC converters. This configuration setup is illustrated in the systems in FIGS. 9 and 10, respectively. The single DC-DC converter can be of any type according to embodiments of the present invention.

Other configurations for the connection of the individual converters the system 1000 are: in parallel in the HV side 107 and in series in the LV side 109, in series in the HV side 107 and in series in the LV side 109, and in parallel in the HV side 107 and in parallel in the LV side 109.

Figure 9:
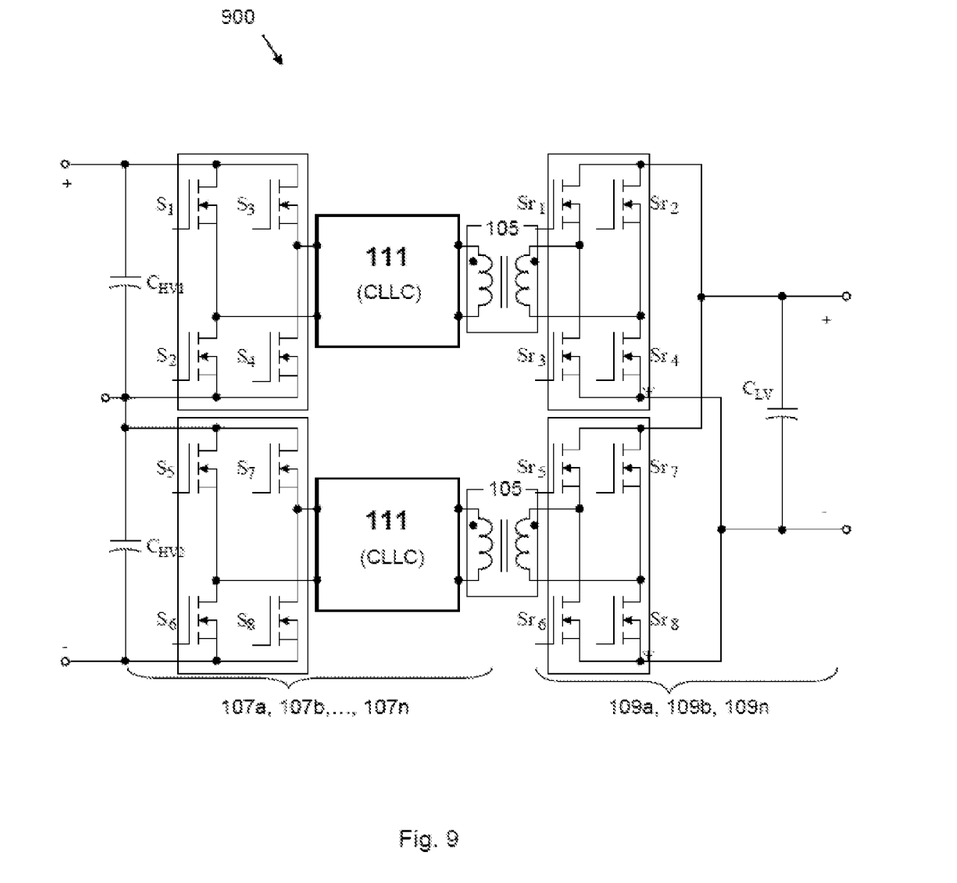
FIG. 9 shows a bi-directional DC-DC converter system according to an embodiment of the present invention comprising CLLC bi-directional DC-DC converters.

FIG. 9 shows a DC-DC converter system 900 according to an embodiment of the present invention in which the resonant tank circuit 111 of each DC-DC converter in the system 900 is of the CLLC type as explained above. In detail does FIG. 9 show an interleaving of a plurality of converters 200 as shown in FIG. 2. In this system 900, the HV sides 107a . . . 107n of the converters are connected in series between a positive HV terminal and a negative HV terminal of the system 900. The LV sides 109a . . . 109n of the converters are connected in parallel to a positive LV terminal and a negative LV terminal of the system 900.

Figure 10:
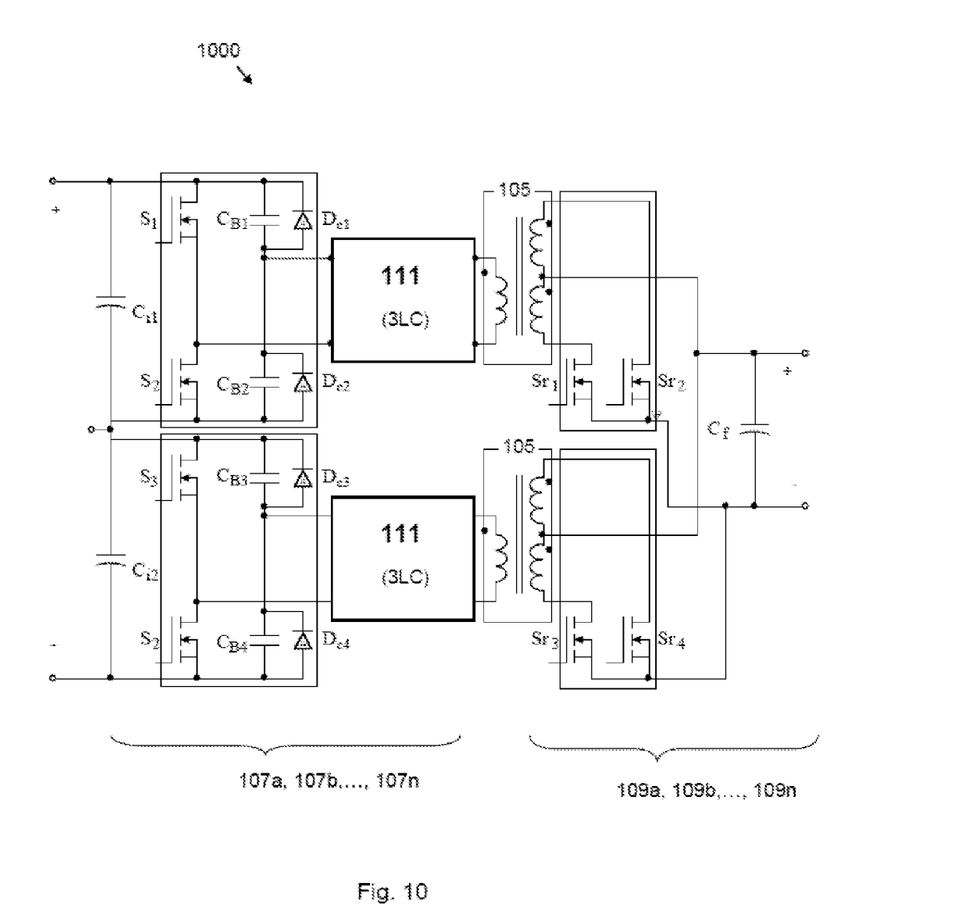
FIG. 10 shows a bi-directional DC-DC converter system according to an embodiment of the present invention comprising 3LC bi-directional DC-DC converters.

FIG. 10 shows a DC-DC converter system 1000 according to an embodiment of the present invention in which the resonant tank circuit 111 of each converter in the system 1000 is of the 3LC type as explained above. In details does FIG. 10 show an interleaving of a plurality of converters 300 as shown in FIG. 5. In this system 1000, the HV sides 107a . . . 107n of the converters are connected in series between a positive HV terminal and a negative HV terminal of the system 1000. The LV sides 109a . . . 109n of the converters are connected in parallel to a positive LV terminal and a negative LV terminal of the system 1000.

Although the examples in FIGS. 9 and 10 showed an interleaving of the DC-DC converters 200 and 300, further embodiments also include an interleaving the other DC-DC converters introduced in this documents (also in the general form of the DC-DC converter 100).

Finally, it should be understood that the present invention is not limited to the embodiments described above, but also relates to and incorporates all embodiments within the scope of the appended independent claims.

What is claimed is:

1. A bi-directional DC-DC converter comprising:
   a first terminal circuit;
   a second terminal circuit;
   a transformer circuit;
   a first high voltage side coupled to the first terminal circuit, wherein the first high voltage side comprises a resonant tank circuit coupled between a first bridge circuit of the first high voltage side and a high voltage side of the transformer circuit, wherein the resonant tank circuit comprises:
   a) a first branch comprising a first capacitor $C_{r1}$ and a first inductor $L_{r1}$ coupled in series;
   b) a second branch comprising a second inductor $L_{r2}$ and a second capacitor $C_{r2}$ coupled in series; and
   c) a third branch comprising a third capacitor $C_{r3}$ and a third inductor $L_{r3}$ coupled in series;
   wherein the first, second and third branches are coupled to a common node, the second branch is coupled between the common node and a first terminal of the high voltage side of the transformer circuit and the third branch is coupled between the common node and a second terminal of the high voltage side of the transformer circuit; and
   a second low voltage side coupled to the second terminal circuit, wherein the first high voltage side and the second low voltage side are coupled to each other via the transformer circuit.

2. The bi-directional DC-DC converter according to claim 1, wherein the resonant tank circuit comprises:
   a first branch comprising a first capacitor $C_{r1}$ and a first inductor $L_{r1}$ coupled in series;
   a second capacitor $C_{r2}$; and
   a second inductor $L_{r2}$;
   wherein the first branch, the second inductor $L_{r2}$ and the second capacitor $C_{r2}$ are coupled to a common node;
   wherein the second capacitor $C_{r2}$ is coupled between the common node and a first terminal of the high voltage side of the transformer circuit; and
   wherein the second inductor $L_{r2}$ is coupled between the common node and a second terminal of the high voltage side of the transformer circuit.

3. The bi-directional DC-DC converter according to claim 2, wherein:
   a first terminal of the first capacitor $C_{r1}$ forms a first terminal of the resonant tank circuit;
   a second terminal of the first capacitor $C_{r1}$ is connected to a first terminal of the first inductor $L_{r1}$;
   a second terminal of the first inductor $L_{r1}$ is connected to a first terminal of the second capacitor $C_{r2}$ and to a first terminal of the second inductor $L_{r2}$;
   a second terminal of the second inductor $L_{r2}$ forms a third terminal of the resonant tank circuit; and
   a second terminal of the second capacitor $C_{r2}$ forms a second terminal of the resonant tank circuit.

4. The bi-directional DC-DC converter according to claim 3, wherein:
   the first terminal of the resonant tank circuit and the third terminal of the resonant tank circuit are connected to the first bridge circuit; and
   the second terminal of the resonant tank circuit and the third terminal of the resonant tank circuit are connected to the high voltage side of the transformer circuit.

5. The bi-directional DC-DC converter according to claim 2, wherein:
   a) the first bridge circuit is a full bridge and the second low voltage side comprises a further full bridge coupled to a low voltage side of the transformer circuit; or
   b) the first bridge circuit is a half bridge, the second low voltage side comprises a push-pull circuit connected to the low voltage side of the transformer circuit wherein the low voltage side of the transformer circuit comprises a second winding comprising a center tap; or
   c) the first bridge circuit is a half bridge and the second low voltage side comprises a push-pull circuit with an autotransformer connected to the low voltage side of the transformer circuit.

6. The bi-directional DC-DC converter according to claim 1, wherein:
   a first terminal of the first capacitor $C_{r1}$ forms a first terminal of the resonant tank circuit;
   a second terminal of the first capacitor $C_{r1}$ is connected to a first terminal of the first inductor $L_{r1}$;
   a second terminal of the first inductor $L_{r1}$ is connected to a first terminal of the second inductor $L_{r2}$ and to a first terminal of the third inductor $L_{r3}$;

a second terminal of the second inductor $L_{r2}$ is connected to a first terminal of the second capacitor $C_{r2}$;

a second terminal of the second capacitor $C_{r2}$ forms a second terminal of the resonant tank circuit;

a second terminal of the third inductor $L_{r3}$ is connected to a first terminal of the third capacitor $C_{r3}$; and a second terminal of the third capacitor $C_{r3}$ forms a third terminal of the resonant tank circuit.

7. The bi-directional DC-DC converter according to claim 6, wherein:
   the first terminal of the resonant tank circuit and the third terminal of the resonant tank circuit are connected to the first bridge circuit; and
   the second terminal of the resonant tank circuit and the third terminal of the resonant tank circuit are connected to the high voltage side of the transformer circuit.

8. The bi-directional DC-DC converter according to claim 1, wherein:
   a) the first bridge circuit is a full bridge and the second low voltage side comprises a further full bridge coupled to a low voltage side of the transformer circuit, or
   b) the first bridge circuit is a half bridge and the second low voltage side comprises a full bridge coupled to a low voltage side of the transformer circuit, or
   c) the first bridge circuit is a half bridge, the second low voltage side comprises a push-pull circuit connected to the low voltage side of the transformer circuit, wherein the low voltage side of the transformer circuit comprises a second winding comprising a center tap, or
   d) the first bridge circuit is a half bridge and the second low voltage side comprises a push-pull circuit with an autotransformer connected to the low voltage side of the transformer circuit.

9. The bi-directional DC-DC converter according claim 1, wherein at least two of the first inductor $L_{r1}$, the second inductor $L_{r2}$ and the third inductor $L_{r3}$ are magnetically coupled to each other in one common magnetic core.

10. The bi-directional DC-DC converter according to claim 1, further comprising a second filter coupled between a positive terminal and a negative terminal of the second terminal circuit.

11. The bi-directional DC-DC converter according to claim 1, further comprising: a first filter coupled in parallel with the first bridge circuit.

* * * * *